April 5, 1960 H. A. SLOAN 2,931,592
SPINNING REEL MECHANISM
Filed April 14, 1955 5 Sheets-Sheet 1
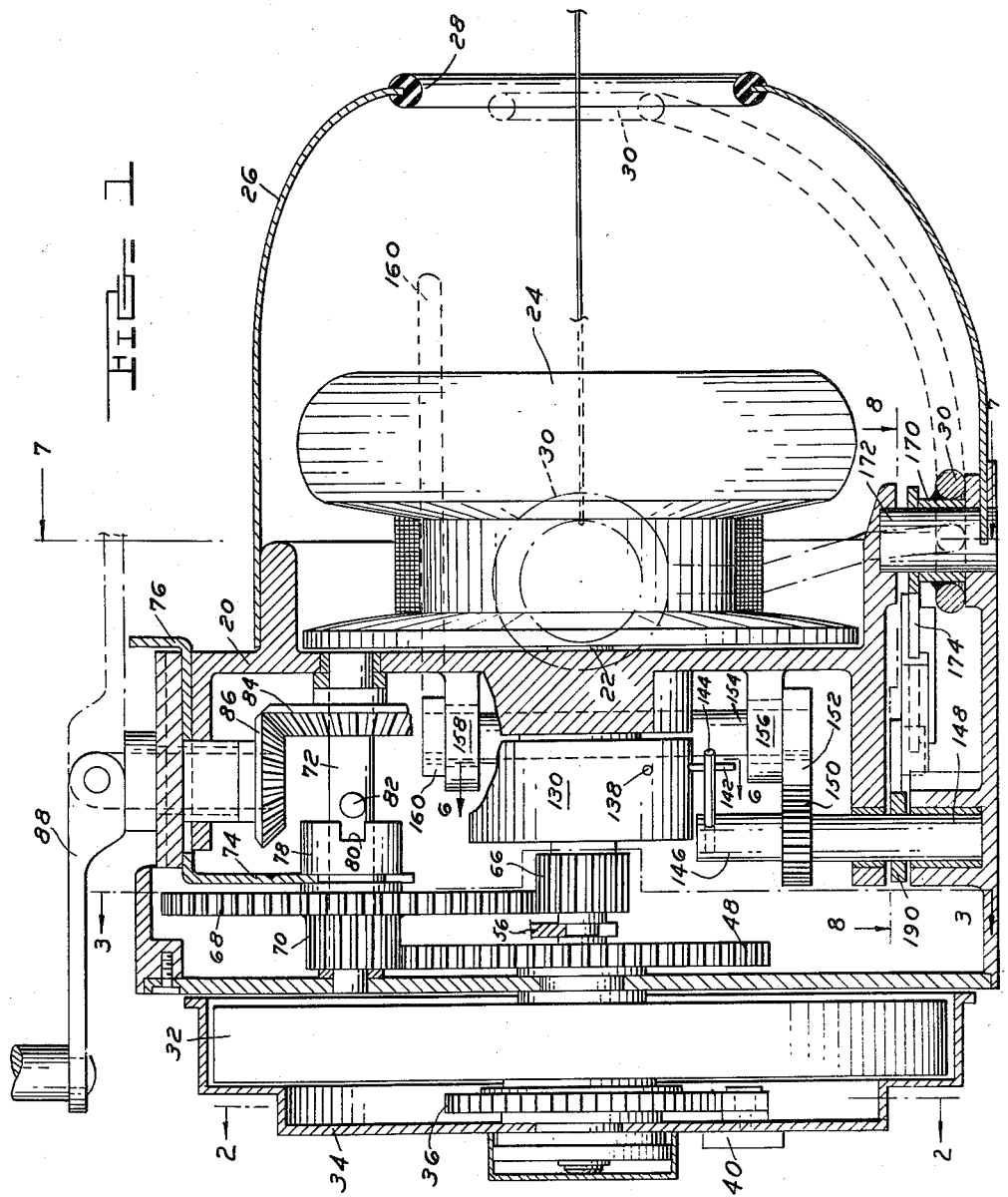
INVENTOR.
HAROLD A. SLOAN
BY
Barnes, Kisselle, Laughlin & Raisch
ATTORNEYS April 5, 1960  H. A. SLOAN  2,931,592
SPINNING REEL MECHANISM
Filed April 14, 1955  5 Sheets-Sheet 2
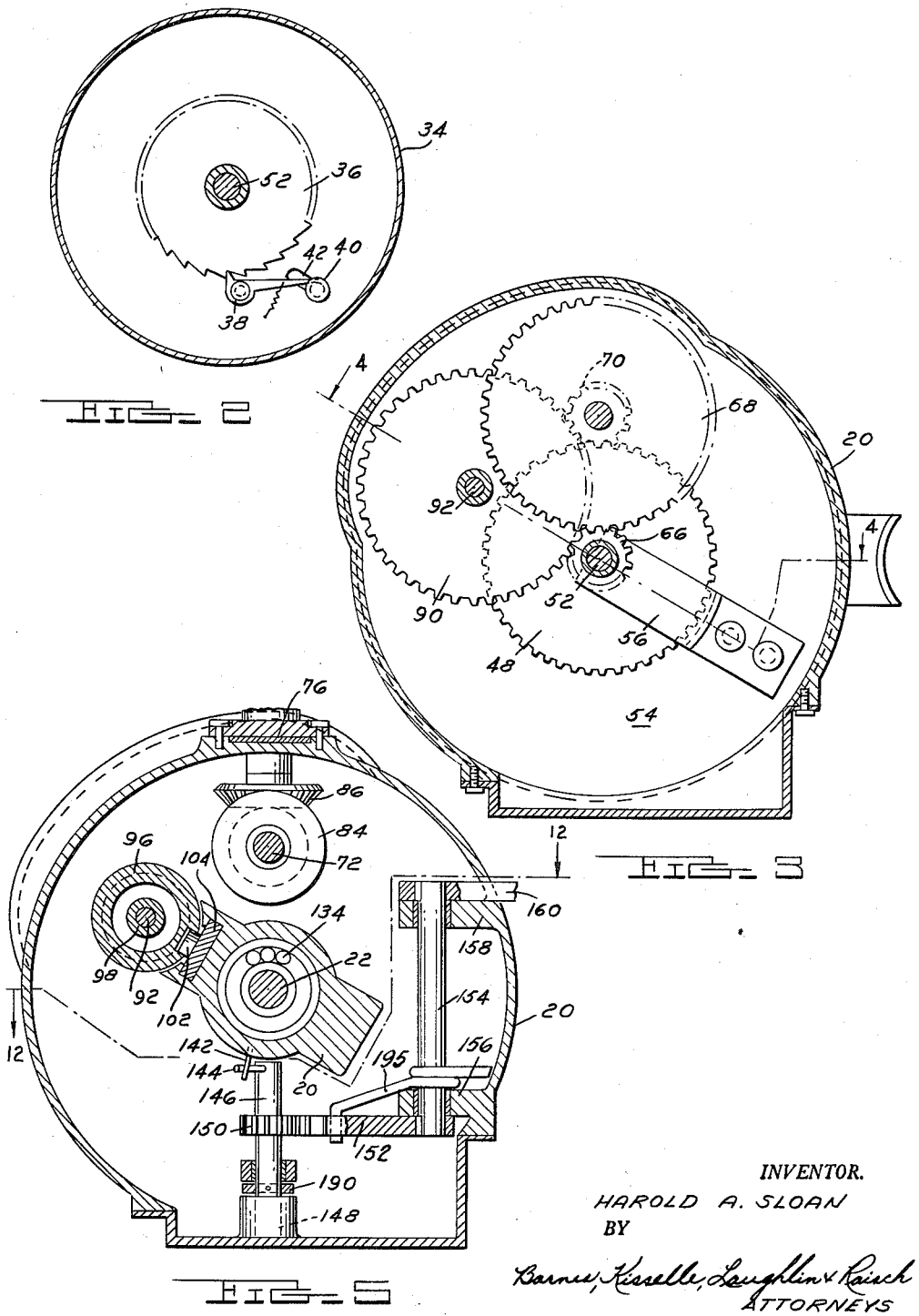
INVENTOR.
HAROLD A. SLOAN
BY
*Barnes, Kisselle, Laughlin & Raisch*
ATTORNEYS

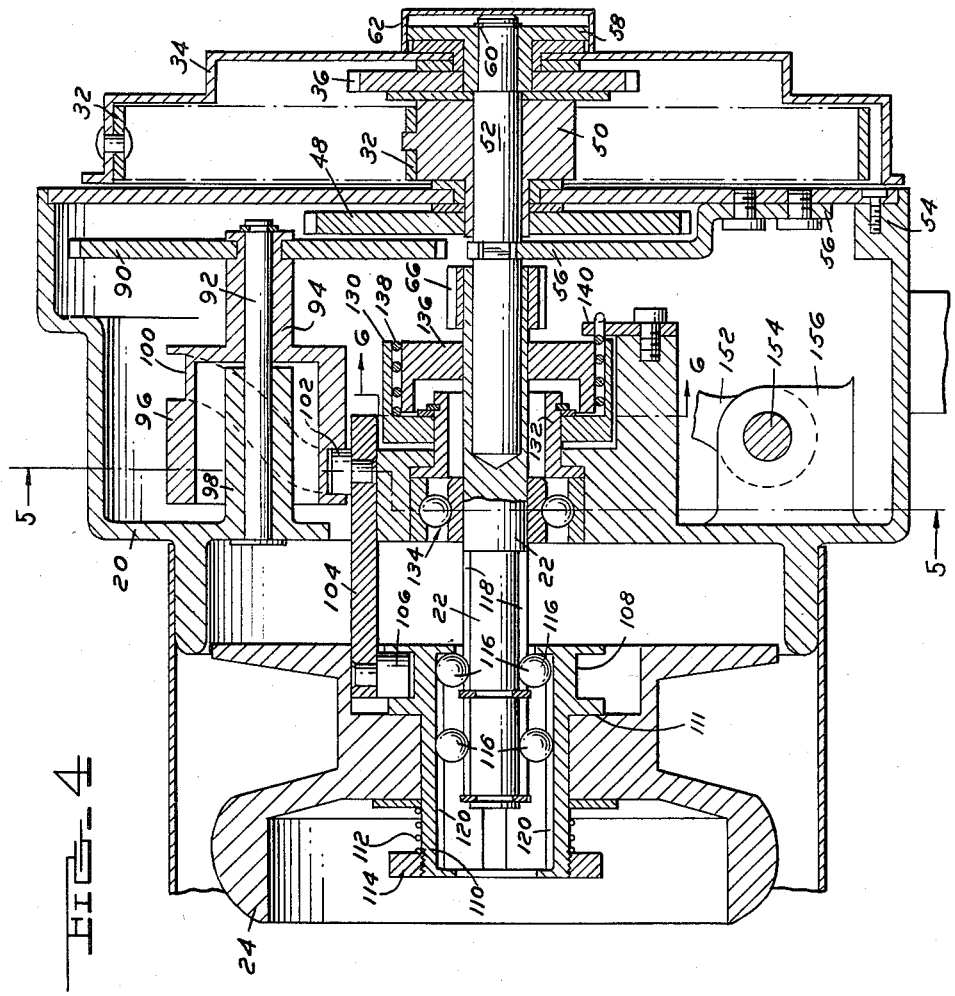

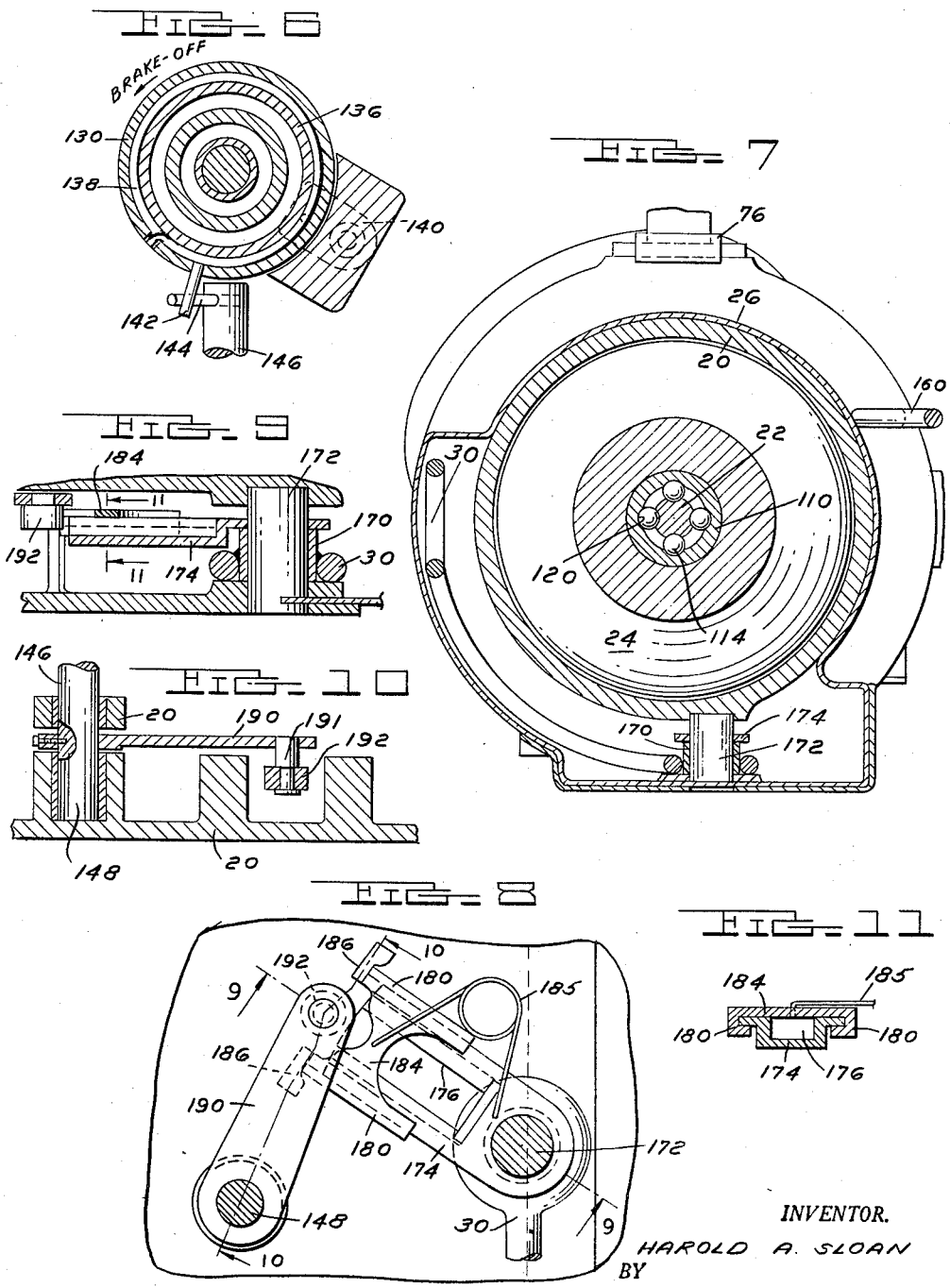

April 5, 1960   H. A. SLOAN   2,931,592
SPINNING REEL MECHANISM
Filed April 14, 1955   5 Sheets-Sheet 5
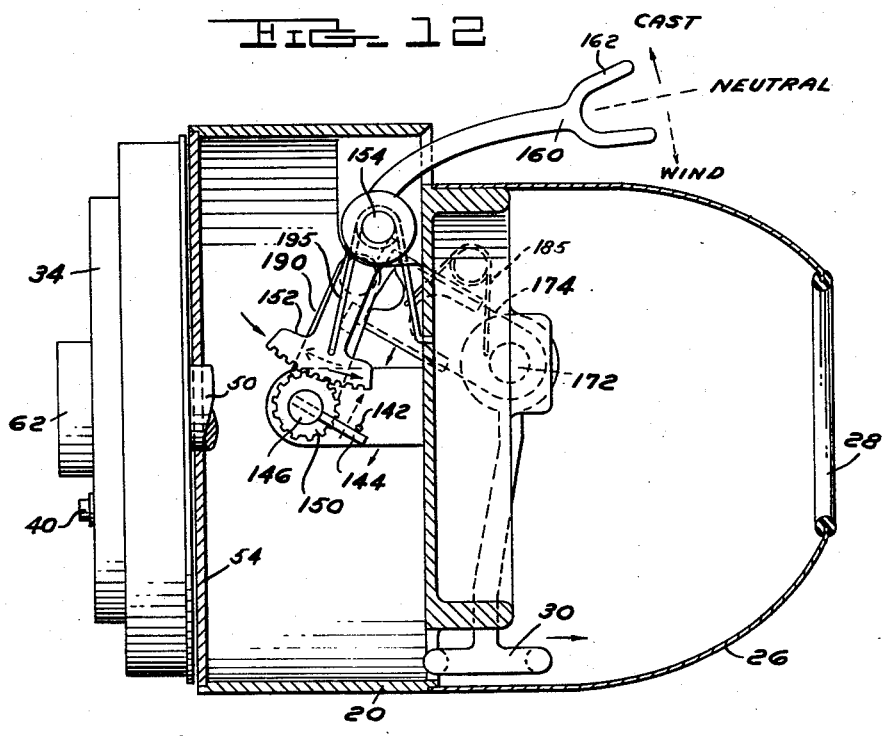
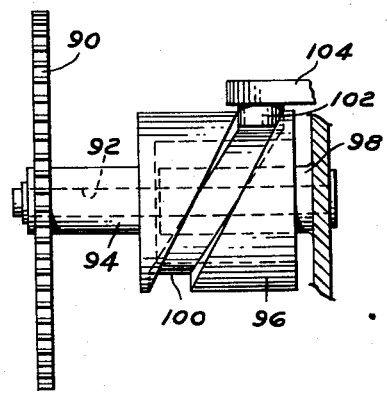
INVENTOR.
HAROLD A. SLOAN
BY
*Barnes, Kisselle, Laughlin & Raisch*
ATTORNEYS

United States Patent Office 2,931,592
Patented Apr. 5, 1960

2,931,592

SPINNING REEL MECHANISM

Harold A. Sloan, Detroit, Mich.

Application April 14, 1955, Serial No. 501,333

16 Claims. (Cl. 242—84.21)

This invention relates to a spinning reel mechanism and has particularly to do with an automatic wind reel.

It is an object of the invention to provide a reel which can be completely controlled, primarily by the little finger of the right hand, permitting the entire rod and reel to be under the control of one hand, leaving the other hand free for other purposes. For example, when the fisherman is working in fast water which is relatively deep, it is sometimes necessary to maintain a hold on a near-by tree or branch to avoid being swept away.

It is, therefore, an object to provide an automatic spinning reel which can be used for any type of fishing in fresh water. It can be used as a casting reel with an automatic wind or a manual wind, and it can be used for trolling, still fishing, or any other type of fishing.

It is a further object to provide a reel with a combination control brake and bail operation and a composite bail lock which insures proper position for reel-out.

Drawings accompany the disclosure, and the various views thereof may be briefly described as:

Figure 1, a longitudinal section of the entire reel showing the relationship of the working parts.

Figure 2, a sectional view on line 2—2 of Figure 1 showing the ratchet arrangement of the power spring.

Figure 3, a sectional view on line 3—3 of Figure 1 showing the relationship of the drive gears.

Figure 4, a longitudinal sectional view taken on line 4—4 of Figure 3.

Figure 5, a cross sectional view on line 5—5 of Figure 4.

Figure 6, a partial transverse section showing the details of a brake mechanism.

Figure 7, a transverse section on line 7—7 of Figure 1.

Figure 8, a partial sectional view on line 8—8 at the bottom of Figure 1 showing the details of the brake release and bail actuating mechanism.

Figure 9, another sectional view on line 9—9 of Figure 8.

Figure 10, a further section on line 10—10 of Figure 8.

Figure 11, a detail section on line 11—11 of Figure 9.

Figure 12, a sectional view showing a manual actuator mechanism taken on line 12—12 of Figure 5.

Figure 13, an elevation of a gear and cam mechanism utilized for level wind.

Referring to the drawings, in Figure 1 a reel housing, or body mounting, 20 supports a spool shaft 22 on which is slidably mounted a spinning reel spool 24. A casting 26 surrounds the spool with an opening therein having a grommet 28 at the margins thereof. A bail 30 is provided for a line guide and mounted in a member which will be described in detail later.

A winding spring 32 shown at the left-hand end of Figure 1 is wound by a casing 34 which surrounds the spring, the winding of the spring being controlled by a rigid gear 36 locked against reversal by a ratchet 38 which can be controlled by a slide button 40 which controls a ratchet catch 42 (see Figure 2). Spring 32 (Figure 4) acts on a central gear 48 through a hub 50 on shaft 52 which telescopes into shaft 22. Shaft 52 is supported on a back wall 54 of the housing by a forked bracket 56 which slides into slots on either side of the shaft 52 to hold the shaft from turning.

A flanged bushing 58 on the end of shaft 52 supports the housing 34, the parts being assembled by a snap ring 60. A small cap 62 covers this end of the shaft 52. A drive gear 66 on the end of shaft 22 forms the main drive source for shaft 22 and the spool 24. This drive gear meshes with a gear 68 which is driven from a gear hub 70, meshing with the spring-operated gear 48.

Gear 68 is shiftable on a mounting shaft 72, it being freely rotatable in the position shown in Figure 1. It may be shifted by a slide bracket 74 actuated by a projection 76 passing through the housing to the outside.

Slide bracket 74 yokes over the hub 78 to shift the gear axially so that the hub, through a notch 80, will engage pins 82 on opposite sides of the shaft 72. This shaft 72 may be operated manually through bevel gears 84 and 86, the latter bevel gear being actuatable by a crank 88 on the outside of the housing.

Thus, it will be seen that the actuating gear 66 can be operated by the spring 32 through gear 48 or by the gear 68, depending on the position of the slide bracket 74—76. It is also possible to permit unwinding of the spring by release of the ratchet lock 42 operated by the button 40.

A level wind mechanism is also provided to be actuated by a gear 90, which receives motion also from gear hub 70 (see Figure 3). Gear 90 is supported on a shaft 92, on which is also supported a hub 94 which terminates in a cam drum 96 surrounding a post stud 98 extending from the housing. This cam drum has a surface cam groove 100 which co-operates with a cam follower roller 102 mounted on a slide bar 104. On the other side of slide bar 104 from the roller 102 is a roller 106 which engages in a straight groove 108 in a central drum 110 mounting the spool 24. The spool is slidable on the drum 110, it being controlled in its movement by a coil spring 112 seated at one end on a ring nut 114 and at the other end on the spool forming a slip clutch with pressure adjusted by nut 114 on a flange 111 of drum 110 to prevent breaking of the line.

The drum 110 is slidably mounted on shaft 22 by ball bearings 116 which slide in spline grooves 118 on shaft 22 and 120 on the interior of drum 110. A suitable ball spacer can be provided. There is thus a spline drive from shaft 22 to drum 110 and also a sliding relationship which permits the spool to reciprocate axially for a level wind controlled by the rotating drum 96 driven by gear 90, which is always in mesh with the hub gear 70.

In the center of the mechanism, as shown in Figures 1 and 4, is a brake drum 130 associated with the housing by a small bushing 132 adjacent a bearing 134 which mounts the shaft. Mounted to rotate with the shaft 22 is a flanged disk 136 which underlies the walls of drum 130 radially spaced inwardly therefrom.

Interposed between the disks 136 and the drum 130 is a coil spring 138, one end of which is anchored in an adjusting post 140 mounted on the housing, and the other end of which is anchored in the drum 130 (see Figure 6). The drum 130 is rotatable on the hub 132, and an abutment pin 142 projects from the drum 130 to permit manipulation thereof. The pin 142 is actuated by a pin 144 extending radially from a shaft 146 mounted in the housing at its base 148.

On shaft 146 is a gear 150 in mesh with a rack gear arm 152 mounted on a shaft 154 which is supported by housing brackets 156 and 158. At the upper end of shaft 154, as viewed in Figure 1, is mounted a control lever 160 with a forked end 162 to permit control by the little finger of the right hand. Shifting of lever 160 (see dotted arrows in Figure 12) causes pin 144 on shaft 146 to relieve the grip of coil spring 138 on flanged drum 136, thus releasing the spool for rotation either by spring 32 or by manual wind, depending on the position of slide bracket 74—76.

The operation of the bail 30 is also co-ordinated with this brake release. The bail is mounted on a bushing 170 which in turn is mounted on a stud pin 172. Extending radially from bushing 170 is a U-shaped member 174 having formed therein a slot 176, the outer edges forming slides for overturned edges 180 of a slide plate 184. A hair pin spring 185 is anchored at one end in member 174 and at the other end in plate 184. Lock-lugs 186 limit the motion of plate 184 and lever 174.

An arm 190 on shaft 146, Figures 1 and 10, extends toward slide 184 and has a pin 191 and a roller 192 positioned to enter slot 176 of member 174 as lever 190 is rotated in a clock-wise direction as viewed in Figure 8. Lever 190 will carry lock-plate 184 inwardly releasing it from lock-lugs 186. At the same time roller 192 will engage the slot of member 174 and cause the finger to rotate in a counter-clockwise motion (Figure 8), thus shifting the bail 30 from a wind position to a spin cast position as shown at the center of Figure 1 in dotted lines. (See solid-line arrows of Figure 12).

When lever 160 is in neutral position, bail 30 is in wind position and locked. Shifting of lever 160 up as shown in Figure 12 moves the bail against spring 195 to spin-cast position. Release of the lever 160 to the neutral position permits bail 30 to return to wind position by action of spring 195. A down motion on lever 160 (Figure 12) causes release of the brake and permits wind, manual or automatic. Spring 195 is preferably strong enough to overcome brake spring 138 so complete release of lever 160 permits wind action.

In the overall operation of the device it is preferably suspended from a pole in the usual fashion so that the operating lever 160 can be manipulated readily by the little finger of the right hand. The winding spring 32 is tensioned by a clockwise winding of the casing 34, and the brake drum 130 holds the spring tension until it is desired to retrieve the line, which has been allowed to spin out either in a casting operation or a trolling operation.

The casting is accomplished by shifting of the lever 160, which operates the rack gear 152 and the shaft 146, shifting the bail 30 to a position concentric with the opening 28 of the reel. After the line is out, the bail is permitted to move to neutral or wind position, where it locks in place by reason of the positioning of plate 184 between lugs 186, this plate being held in such position by the spring 185. At this point, spring 195, acting on arm 152, moves the actuating lever 160 downwardly, causing a shifting of shaft 146 in a manner to release brake spring 138 through pins 142 and 144. This allows the gears through the wind spring 32 to turn the spool 24 at a ratio of 16 to 1.

The operator at will can stop the wind motion by shifting the lever 160 with the little finger. Thus, spin casting and retrieving of the line can be achieved by the movement of the small finger of the right hand, which holds the rod.

The nut 114 allows adjustment or tightening of spring 112 against spool 24, creating more friction against the shoulder and allowing the user to feed any tension he wishes for spool slippage and to protect against line breakage. The level wind is in operation at all times while the line is being retrieved either automatically or manually.

If the operator does not wish to use the automatic wind and desires to wind manually, he may relieve the spring 32 by holding the casing 34 in a wind position while pushing the ratchet catch 40 forward and allowing the cover to slip backward in the hand until the spring 32 is fully unwound. The gear shift lever 76 may then be pulled out and will slide gear 68 forward, engaging lug 82 with notch 80 and disengaging the hub gear 70 from drive gear 48.

The operator may then turn the crank 88, which operates the shaft 72 through the bevel gears 84 and 86 and which transfers motion through gear 68 to the central gear 66. The crank arm can be folded back when not in use, and it will be clear that the gear shift lever may be moved to the position shown in Figure 1 when it is desired to use the spring wind. It is essential that the spring wind be stripped or relieved before going into manual wind.

I claim:

1. In a spinning reel for single hand, single finger control of the type comprising, a body mounting, a spinning spool rotatable on said body, a spring mounted on said body, and means drivingly connecting said spring and said spool to cause rotation of said spool by said spring, that improvement which comprises a line-guiding bail shiftable on said body from a spin-out position to a retrieve position, lever means to shift said bail, a brake for controlling said spool biased normally into braking position, abutment means to shift said brake to release position, and a single actuating lever mechanically and operatively connected to said lever means and said abutment means operable in a single motion to shift said bail from spin-out position to retrieve position and to release said brake to permit rewind of a line.

2. A device as defined in claim 1 in which the spool is mounted on a shaft centrally of said body, the means for mounting said spool comprising a splined shaft and splined hub co-axial with said shaft, and balls interposed between said shaft and said hub riding axially in said splines to permit axial shifting of said spool on said shaft relative to said body, and means mounted in said body independently operable by said spring to shift said spool axially as it is rotated to effect a level wind of line being retrieved.

3. A device as defined in claim 2 in which the means for effecting the level wind motion of the spool comprises a cam drum rotated by a gear connected with means driven by said spring and a slide bar having a follower shiftable in a cam in said drum at one end and a follower riding in an annular groove in the splined hub of said spool at the other end.

4. A device as defined in claim 3 in which the spool is mounted on said splined hub for rotation thereon, and resilient means is interposed between said hub and said spool to provide a safety relief for said spool as it is being retrieved, there being an adjustable means to regulate said resilient means at the will of the operator.

5. A device as defined in claim 1 in which the spool is mounted on a shaft and a main drive gear is connected with said spring, a second transmission gear is connected with the mounting shaft of said spool, a hub on said transmission gear, a manual drive mechanism, said transmission gear being shiftable from a position having said gear hub in engagement with said first gear to a position out of engagement with said first gear and into engagement with said manual drive, and crank means having a manipulatable extension manually operable for actuating said manual drive at the will of the operator.

6. A device as defined in claim 5 in which said crank means is shiftable selectively to an out-of-wind position in which the manipulatable part is moved to a nested position.

7. A device as defined in claim 5 in which said transmission gear is also connected through said gear hub with a level wind gear and means connecting said level wind gear with said spool to effect an axial reciprocation of said spool.

8. A device as defined in claim 5 in which a manual operable means is provided at the outside of said housing for shifting said transmission gear to one of its two positions.

9. A device as defined in claim 1 in which said spool is mounted on a shaft and said brake means comprises a cylindrical member mounted to rotate with said spool shaft and a brake drum member mounted concentrically therewith and radially spaced outward from said cylindrical member, and a coil spring having one end adjustably mounted and fixed to said housing and the other end affixed to said brake drum member, and means on said brake drum member for causing rotation thereof to enlarge or ensmall said spring toward and away from an engaging position with said drum, said drum being rotatable by a motion of said single lever means to a brake release position.

10. A device as defined in claim 1 in which said bail is mounted at the side of said body on a rotatable hub, a radial arm extending from said hub, a spring actuated plate slidable radially of said hub on said arm to an outward position, means on said housing to engage said plate in its outward position to lock said hub and bail in a wind position, and means for urging said plate into said outward position.

11. A device as defined in claim 10 in which said single lever means is mounted on said housing, a shaft to be rotated by motion of said lever and an arm on said shaft shiftable upon actuation of said lever to move said plate inwardly away from its outward position, said last named arm simultaneously engaging said radial arm on said ball hub to actuate said radial arm and said bail away from retrieve position to a line feed position.

12. A device as defined in claim 11 in which the shaft which is actuated by the lever means may also be actuated in an opposite direction by the lever means to release the spool brake, thus permitting a retrieving motion of the spool.

13. A spinning reel for a single-hand, single-finger control which comprises a housing body, a rotatable and axially shiftable spinning spool at one end thereof, means to mount said spool for rotation and reciprocation on and relative to said body, a brake mechanism to control rotation of said spool, means to transmit a winding motion to said spool, a line guide shiftable from a spin-out position to a wind position, and control means mechanically connected with said brake and said bail wherein said brake may be released only after said bail is shifted to wind position, resilient means provided to act on said control means to bias it toward brake release position, said brake mechanism including resilient means to bias said brake to engagement when said control means is shifted away from brake release position.

14. A spinning reel for a single-hand, single-finger control which comprises a housing body, a rotatable and axially shiftable spinning spool at one end thereof, means to mount said spool for rotation and reciprocation on and relative to said body, a brake mechanism to control rotation of said spool, means to transmit a winding motion to said spool, a line guide bail shiftable from a spin-out position to a wind position, and control means mechanically connected with said brake and said bail wherein said brake may be released only after said bail is shifted to wind position, said brake mechanism comprising two concentric cylindrical members radially spaced and connected respectively with said spool and said housing, a coil spring interposed between and normally having mutual engagement with said cylindrical members, said spring having one of its respective ends affixed to one of said members, and means to actuate the other of said ends to cause a change in diameter of said spring and a release of said mutual engagement of said spring with said cylinder, said last means being operable by said control means.

15. In a spinning reel including a housing body, a rotatable and axially shiftable spinning spool at one end thereof, a brake mechanism to control rotation of said spool, means to transmit a winding motion to said spool and a line guide bail shiftable from a spin-out position to a line-wind position, that improvement which comprises, a control means mechanically connected with said brake and said bail wherein said brake may be released only when said bail is in wind position, said control means including a lever operable to shift said bail to spin-out position, a U-shaped member fastened to said bail to receive an extension of said lever to cause shifting of said bail upon shifting of said lever, and a slidable lock means on said U-shaped member releasably biased into a locking position relative to said housing body, said lever serving to shift said locking means simultaneously with the shifting of said U-shaped member to release said bail from lock position prior to shifting it to a spin-out position.

16. A spinning reel for single-hand, single-finger control which comprises, a body mounting, a spinning spool rotatable on said body, a spring mounted on said body, and means connecting said spring and said spool to cause rotation of said spool by said spring, a line-guiding bail shiftable on said body from a spin-out position to a retrieve position, a brake for controlling said spool, and a single lever means operable in one motion to shift said bail from one position to another and operable also to release said brake only when said bail is in retrieve position to permit re-wind of said line, means for connecting said lever means to said bail, wherein operation of said lever means in one direction moves said bail to a run-out position, and means connecting said lever means to said brake, wherein movement of said lever means away from the run-out position releases said brake to permit re-wind.

References Cited in the file of this patent

UNITED STATES PATENTS

| | | |
|---|---|---|
| 2,524,451 | Larkin | Oct. 3, 1940 |
| 2,587,462 | Goldberg | Feb. 26, 1952 |
| 2,630,978 | Skarbek | Mar. 10, 1953 |
| 2,690,309 | Cuonz et al. | Sept. 28, 1954 |
| 2,711,865 | Ruterbories | June 28, 1955 |
| 2,723,808 | Elliott et al. | Nov. 15, 1955 |

FOREIGN PATENTS

| | | |
|---|---|---|
| 471,218 | Great Britain | Aug. 31, 1937 |
| 483,914 | Great Britain | Apr. 25, 1938 |
| 614,837 | Great Britain | Dec. 23, 1948 |